(12) United States Patent
Knowles

(10) Patent No.: US 7,627,330 B2
(45) Date of Patent: Dec. 1, 2009

(54) MOBILE ELECTRONIC DEVICE HAVING A GEOGRAPHICAL POSITION DEPENDENT LIGHT AND METHOD AND SYSTEM FOR ACHIEVING THE SAME

(75) Inventor: Michael Knowles, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 91 days.

(21) Appl. No.: 11/045,073

(22) Filed: Jan. 31, 2005

(65) Prior Publication Data

US 2006/0172745 A1 Aug. 3, 2006

(51) Int. Cl.
*H04M 7/20* (2006.01)
(52) U.S. Cl. .................................. 455/456.1
(58) Field of Classification Search .............. 455/456.1; 370/331; 345/207
See application file for complete search history.

(56) References Cited

U.S. PATENT DOCUMENTS

| | | | |
|---|---|---|---|
| 6,411,899 B2 | 6/2002 | Dussell et al. | |
| 6,664,744 B2 | 12/2003 | Dietz | |
| 6,728,552 B2 | 4/2004 | Chatain | |
| 6,812,649 B2 | 11/2004 | Kim | |
| 2003/0143986 A1* | 7/2003 | Mufti et al. | 455/414 |
| 2004/0164948 A1 | 8/2004 | Kabel et al. | |
| 2004/0203909 A1* | 10/2004 | Koster | 455/456.1 |
| 2004/0212993 A1* | 10/2004 | Morgan et al. | 362/231 |
| 2005/0125669 A1* | 6/2005 | Stewart et al. | 713/171 |
| 2005/0259618 A1* | 11/2005 | Ahya et al. | 370/331 |
| 2006/0146652 A1* | 7/2006 | Huizi et al. | 368/107 |
| 2006/0167647 A1* | 7/2006 | Krumm et al. | 702/130 |
| 2006/0267783 A1* | 11/2006 | Smith | 340/601 |

FOREIGN PATENT DOCUMENTS

| | | |
|---|---|---|
| DE | 101 50 823 A1 | 6/2006 |
| EP | 1344373 A1 * | 9/2003 |
| JP | 08338981 | 12/1996 |
| JP | 2002-344599 | 11/2002 |
| WO | WO-00/41379 | 7/2000 |
| WO | WO-02/076068 | 9/2002 |

OTHER PUBLICATIONS

U.S. Naval Observatory, Sun or Moon Altitude/Azimuth Table For One Day, Astronomical Applications Department.
European Search Report for EP 05100628.6, dated Jul. 13, 2005.
European Search Report Application No. 08168892 dated Mar. 24, 2009.

* cited by examiner

*Primary Examiner*—Patrick N Edouard
*Assistant Examiner*—Eric Elcenko
(74) *Attorney, Agent, or Firm*—Ogilvy Renault, LLP

(57) ABSTRACT

The present invention provides a method and system for controlling an illuminating device on a mobile electronic device comprising determining in a global position of the device in real-time, determining a state of at least one light condition currently affecting ambient light at the global position and adjusting the intensity of the illuminating device in response to the state of the at least one light condition. Light conditions include weather conditions and a position of the sun at a particular global position. A mobile electronic device having a geographically dependent illuminating device is also provided.

18 Claims, 4 Drawing Sheets

MOBILE ELECTRONIC DEVICE HAVING A GEOGRAPHICAL POSITION DEPENDENT LIGHT AND METHOD AND SYSTEM FOR ACHIEVING THE SAME

FIELD OF THE INVENTION

This invention relates to the field of mobile electronic devices. Specifically, the invention relates to a method and system for controlling a light based on geographical positional data and a corresponding device having a position dependent light.

BACKGROUND OF THE INVENTION

Mobile electronic devices are becoming more and more ubiquitous because they help users manage their busy schedules, as well as communicate with the world. For example, portable computers, such as notebook or laptop computers, personal data assistants (PDAs) and mobile telephones are becoming necessities for many. Notebook or laptop computers are very popular because they are extremely lightweight personal computers that can easily fit in a briefcase for the mobile businessperson. A PDA is a handheld mobile device that allows users to access information, keep track of their busy schedules, and communicate with others. A typical PDA can function as a mobile or cellular phone, fax sender, and personal organizer. Furthermore, many PDAs are capable of wireless connectivity. It is very important for today's mobile professional to be able to access information from anywhere in the world. Similar to the portable computer, PDAs are very popular because they are designed to be highly portable.

Positional systems have been recently incorporated into personal computers, electronic mobile devices and automobiles. For example, as described in U.S. Pat. No. 5,528,248 to Steiner et al., entitled "Personal Digital Location Assistant Including a Memory Cartridge, A GPS Smart Antenna and a Personal Computing Device"

Real time positional systems often access positional data from various sources, such as local transmitters or satellites. Real time positional systems include GPS (Global Position Satellites), MLS (Microwave Landing Systems), GSM (Global System Mobile), GIS (Geographical Information Systems) and CPS (Cambridge Positioning Systems).

A typical GPS unit includes (along with other components), a GPS receiver for receiving transmitted signals from a number of satellites, a memory in which cartographic data and other location information may be stored, a processor and associated GPS software for determining the location of the unit as a function of the received satellite signals and for accessing and processing data and information in the memory, and typically a display for displaying the information along with an indication of the unit's location. The memory may be integral with the processor, memory chips coupled with the processor, may include plug-in memory modules that fit within corresponding memory slots in the receiver or may be accessed remotely via a network such as wirelessly through the Internet. The processor retrieves information from the memory, for example, to display maps and routing instructions to permit a user of the GPS receiver to navigate to a desired location.

U.S. Pat. No. 6,778,837 to Bade et al. also incorporates GPS functionality into a PDA. Bade et al. describes a system and method for providing access to mobile devices based on positional data. The method involves predefining access parameters, determining the actual location of the device and automatically controlling access to the device.

Aside from size, the principal difference between a notebook, PDA or laptop computer and a personal computer is the display screen. Mobile devices typically use flat-panel technologies, which are lightweight and non-bulky. The primary function of a display screen is to provide a clear and readily viewable presentation to a user. One of the most important factors affecting a user's ability to easily perceive the shapes or images of a presentation is sufficient illumination of the display screen. Ambient light is often insufficient to provide adequate illumination of a display screen and a display screen usually includes lighting provisions such as a backlight. Since, providing too much backlight can also result in whiting out the screen, it is desirable to provide backlights that are automatically controlled.

U.S. Pat. No. 6,812,649 to Kim provides a device and method for controlling LCD backlight. Kim teaches a backlight control device and method for reducing or minimizing the battery usage. Kim teaches operating backlight control using intensity of detected surrounding light within a selected control range from a plurality of backlight control ranges. The backlight control ranges can vary in number but are directed into various levels, according to the intensity of surrounding light and use of a battery or an external power source.

SUMMARY OF THE INVENTION

According to one broad aspect of the invention, there is provided a method for controlling an illuminating device on a mobile electronic device comprising, determining a global position of the device in real-time, determining a state of at least one light condition currently affecting ambient light at the global position and adjusting the intensity of the illuminating device in response to the state of the at least one light condition.

Preferably, the intensity of the illuminating device is adjusted dynamically according to weather conditions and the position of the sun at the global position.

According to another aspect of the invention, there is provided a mobile electronic device having an automatically controlled illuminating device comprising the illuminating device and a controller for determining a current global position of the device and adjusting the intensity of the illuminating device according to a state of at least one light condition currently affecting ambient light at the global position. The controller is coupled to communicate with (a) a receiver configured to receive data from a positioning system to determine the global position and (b) at least one memory storing (i) data used to calculate the global position based on data from the positioning system and (ii) data relating to states of at least one light condition at various global positions.

According to another aspect of the invention, there is provided a system for controlling an illuminating device on a mobile electronic device comprising the mobile electronic device, the illuminating device coupled to the device, a positioning system, a receiver coupled to the device and configured to receive data from a positioning system used to determine a global position of the device, at least one memory for storing data used to determine the global position and data relating to states of at least one light condition at various global positions and a controller coupled to the device and to communicate with the at least one memory, for determining the global position of the device and adjusting the intensity of the illuminating device according to a state of at least one light condition affecting ambient light at the global position.

According to another aspect of the invention, there is provided a data carrier product containing sequences of instructions which when executed causes the performance of the methods of the invention.

According to another aspect of the invention, there is provided a software product containing sequences of instructions which when executed causes the performance of the methods of the invention.

According to another aspect of the invention, there is provided an integrated circuit product containing sequences of instructions which when executed causes the performance of the methods of the invention.

BRIEF DESCRIPTION OF THE DRAWINGS

Embodiments of the invention may best be understood by referring to the following description and accompanying drawings. In the description and drawings, like numerals refer to like structures or processes. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention.

Figure 1:
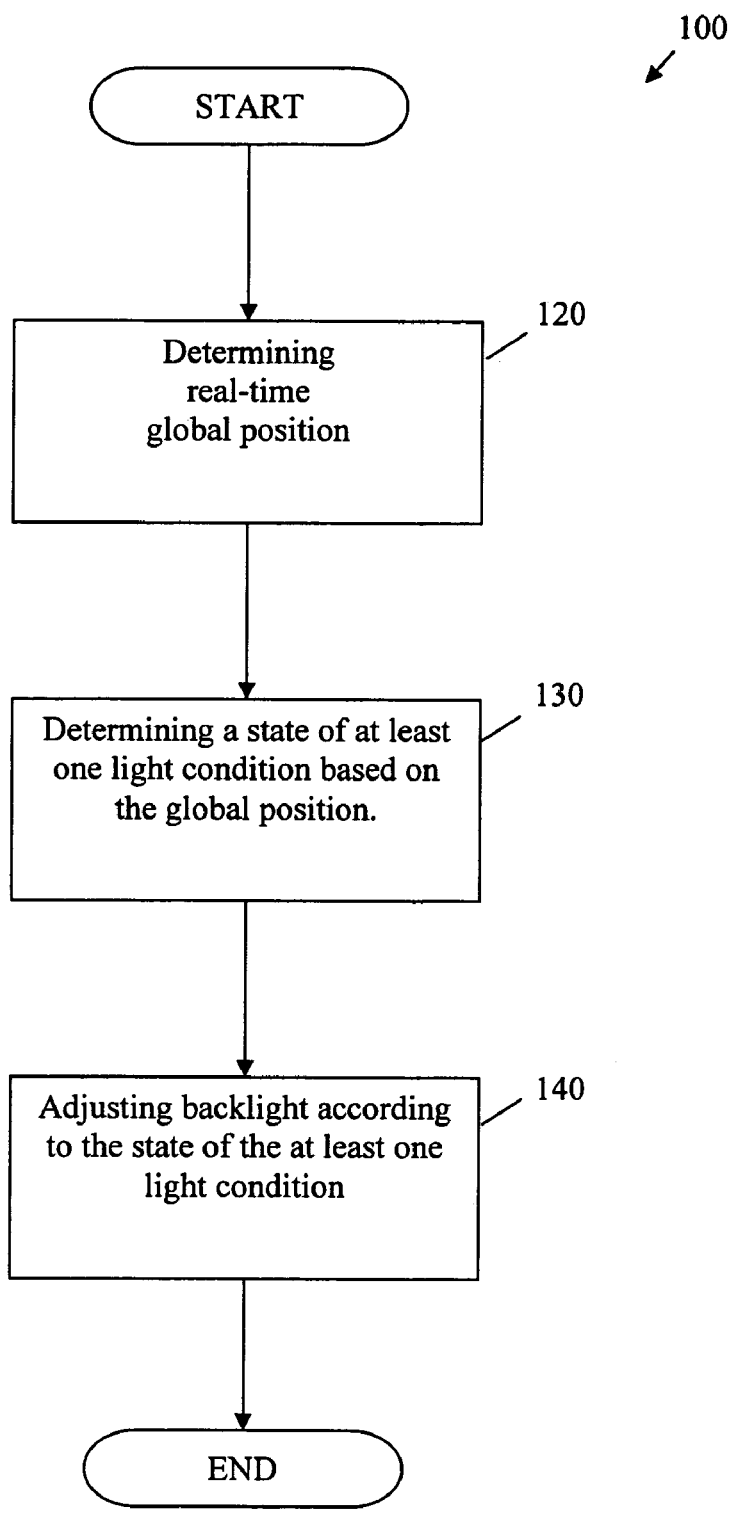
FIG. 1 is a flowchart illustrating operations for controlling a backlight for a display in a mobile electronic device according to a first embodiment of the invention.

Method. Generally, in accordance with an aspect of the invention, there is provided methods for controlling a display backlight on a mobile electronic device based on positional data. An electronic mobile device may include, but is not limited to, laptops, PDAs or mobile phones. It will also be understood by a person skilled in the art that a mobile electronic device may also include devices that are resident on other devices that are mobile such as a navigational computer in a vehicle. Referring to FIG. 1, operations 100 for controlling a display backlight according to a broad embodiment of this aspect of the invention is provided. At step 120, a real-time global position of the device is determined. Real-time global position can be determined using various positional systems, such as, for example, GPS (Global Position Satellites), MLS (Microwave Landing Systems), GSM (Global System Mobile), GIS (Geographical Information Systems) and CPS (Cambridge Positioning Systems). Preferably, the GPS system is used. Typically, GPS information is transmitted to a receiver either in the device or external to the device but capable of communicating with the device. The GPS information, along with cartographic data and other locational information stored on a memory, is processed by a processor which then calculates the real-time global position of the device according to GPS software.

At step 130, a state of at least one light condition is determined based on the real-time global position of the device. Light conditions can include any light condition that currently affects the ambient light at the global position, including, but not limited to, current weather conditions, lunar cycle and the position of the sun or moon (e.g. altitude and optionally azimuth) at that particular time of day. Therefore, with respect to weather condition, the state of the weather condition at the global position may be sunny, cloudy, raining, snowing, . . . etc. These states may affect the ambient light at the global position. Similarly, the state of the position of the sun, particularly the altitude, and optionally azimuth, of the sun relative to the global position, will vary depending on the current time and day. A backlight dependent on the position of the sun will be more accurate than merely using the time of day since sun rise and sun set times differ depending on the global position and the time of year. For example, there can be 24 hour daylight or darkness at the poles of the earth.

State of light conditions at various global positions may be stored and retrieved from a resident memory or an external memory via a network. Preferably, this light condition data is retrieved in real-time wirelessly. It will be understood by a person skilled in the art that the current state of a light condition at the global position may be directly retrieved (e.g. the current position of the sun at the global position), or alternatively, calculated using the current local time at the global position and data regarding light conditions at various times of the day (e.g. the position of the sun at the global position at various times of day). Local time at the global position may be determined by a clock on the device or preferably by retrieving local time data according to the global position. Similarly local time data may be stored and retrieved from a resident memory or an external memory via a network At step 140, the backlight is adjusted according to the state of the at least one light condition. Therefore, the intensity of the backlight will be increased for example, if it is more overcast as opposed to sunny or dusk as opposed to noon. It will be understood by a person of ordinary skill that the backlight can also have only two states, on and off, and adjusting the intensity of the backlight could comprises turning the backlight on.

Figure 2:
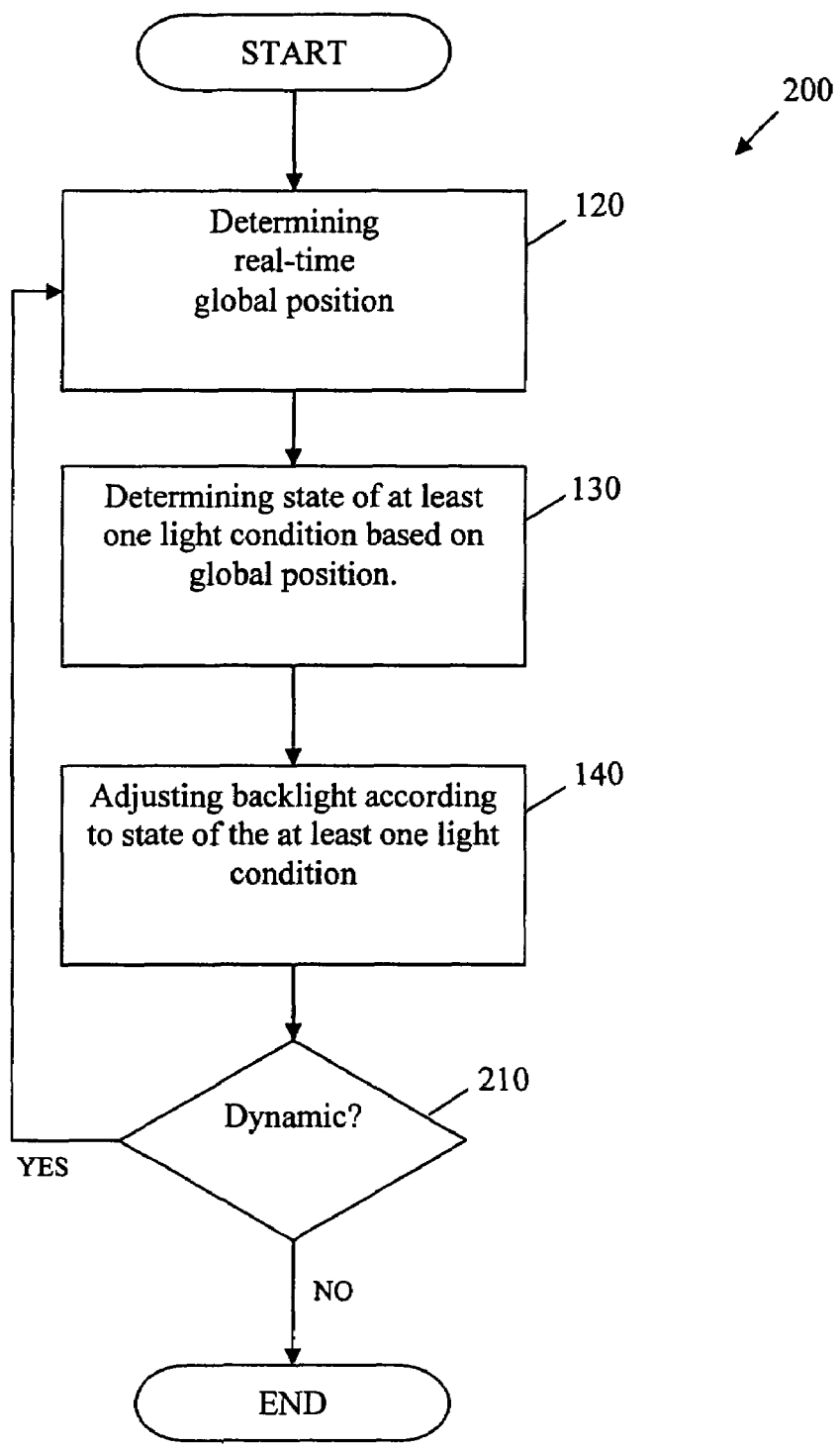
FIG. 2 is a flowchart illustrating operations for controlling a backlight for a display in a mobile electronic device according to a second embodiment of the invention having dynamic control of the illuminating device.

Referring to FIG. 2, a method for controlling the backlight of an electronic mobile device according to another embodiment of the invention is illustrated. In this preferred embodiment, the backlight can be dynamically adjusted based on the global position of the device. Accordingly, with reference to FIG. 2, operations 200 include a further step 210 is provided to operations 100 for looping back to step 120 after step 140 to dynamically adjust the intensity of the backlight based on global position. In this embodiment, the dynamic feature of the method may be tuned on or off as represented by the decisional nature of step 210.

Figure 3:
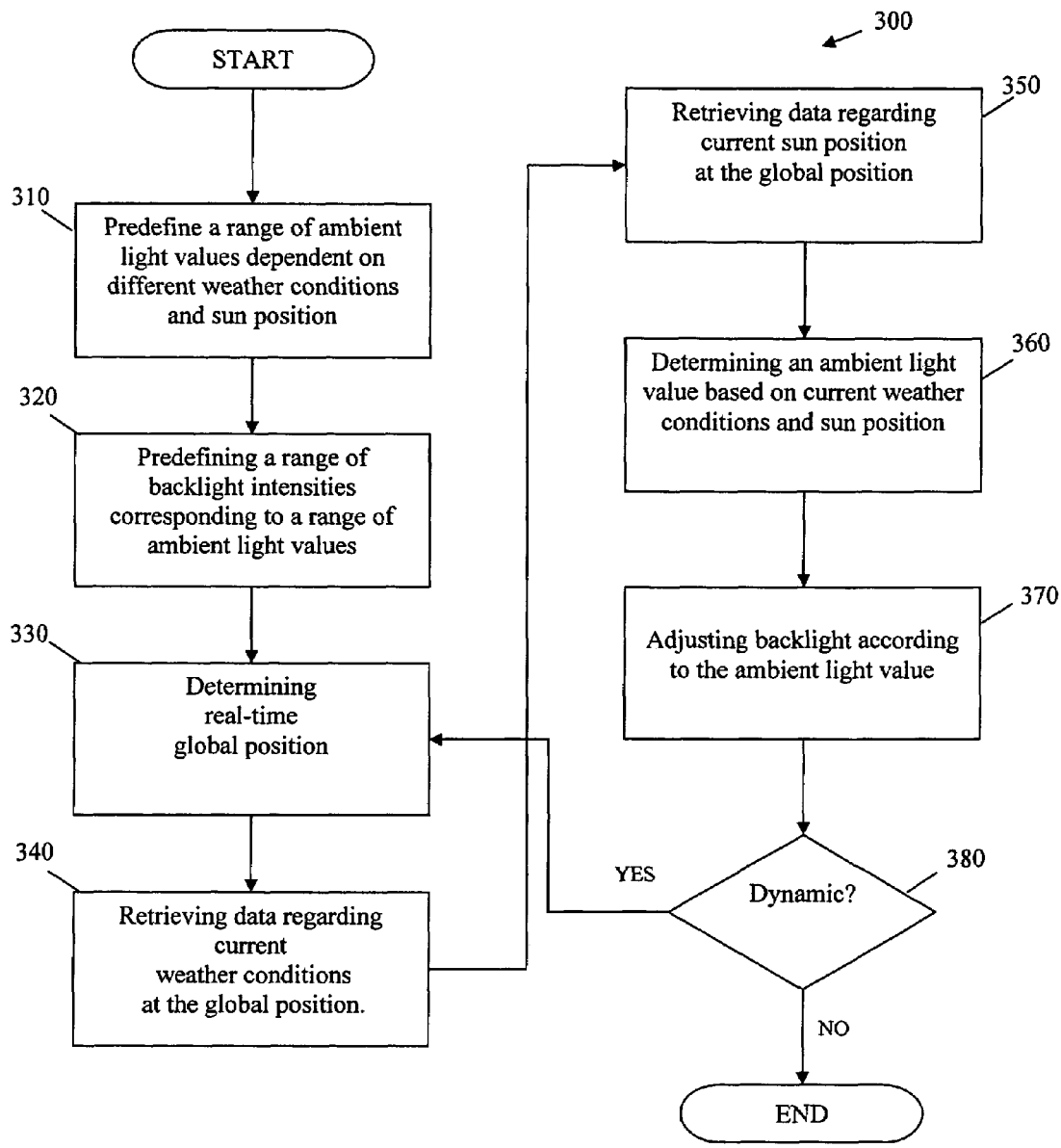
FIG. 3 is a flowchart illustrating operations for controlling a backlight for a display in a mobile electronic device according to another embodiment of the invention.

Referring to FIG. 3, operations 300 according to a preferred embodiment of the invention are provided. At step 310, a range of ambient light values are predefined depending on a state of various light conditions, and more particularly, various weather conditions and a position of the sun relative to various global positions at particular times of the day. In respect of weather conditions, it is anticipated that the ambient light value will change depending on states of the weather, such as those described above, namely, the amount of cloud cover, rain conditions and/or snow conditions at that global position. In respect of sun position, it is similarly anticipated that the ambient light value will change depending on states such as the particular time of day and the altitude of the sun at that time, sun rise and sun set times. As discussed above, this is more accurate than merely calculating an ambient light value based on only the time of day since the altitude and path of the sun differ depending on the global position and the time of year.

The predefined range of ambient light values represents the ambient light at the global position and is therefore preferably dependent on the combination of both weather condition and the position of the sun. For example, when the sun has already set for several hours, typically the middle of the night, there will be little ambient light (for the purposes of viewing a display) despite the sky being relatively clear and this would be reflected in a low ambient light value. A person skilled in the art would understand that incorporating other light conditions is also possible. For example, the fullness and position of the moon at a given global position on a clear night may also affect the amount of ambient light at a given geographical location. Therefore, information regarding the lunar cycle and the position of the moon can also be incorporated into the predefined range of ambient light values.

At step 320, a range of backlight intensities are predefined based on the range of ambient light values.

At step 330 the real-time global position of the device is calculated similar to step 120 of method 100.

Once the global position of the device is determined, at step 340, actual current weather conditions at the global position are retrieved. At step 350, actual current position of the sun data is retrieved based on the global position of the device. As discussed above in connection with method 100, weather condition data and position of the sun data may be stored and retrieved from a resident memory or downloaded in real-time from a network that is preferably wireless.

At step 360, an ambient light value is calculated based on actual weather conditions and position of the sun data at the global position at the current time and according to the ranges of ambient light values predefined at step 310.

At step 370, backlight intensity is adjusted based on the ambient light value and according to the ranges of backlight intensity predefined at step 320.

Since light conditions, such as weather and the position of the sun, tend to have a greater effect on the ambient light at a global position if the user is actually outdoors, operations 100, 200 or 300 may depend on an initial decision step (not shown) of turning the device into "outdoor" mode before proceeding to the remainder of the steps of the invention.

According to another embodiment of the invention, the device can automatically predict whether the device is outdoors or indoors. For example, such a prediction may be based on the global position and comparing the outdoor temperature conditions at the global position to the actual temperature as measured by a temperature sensor on the device.

Figure 4:
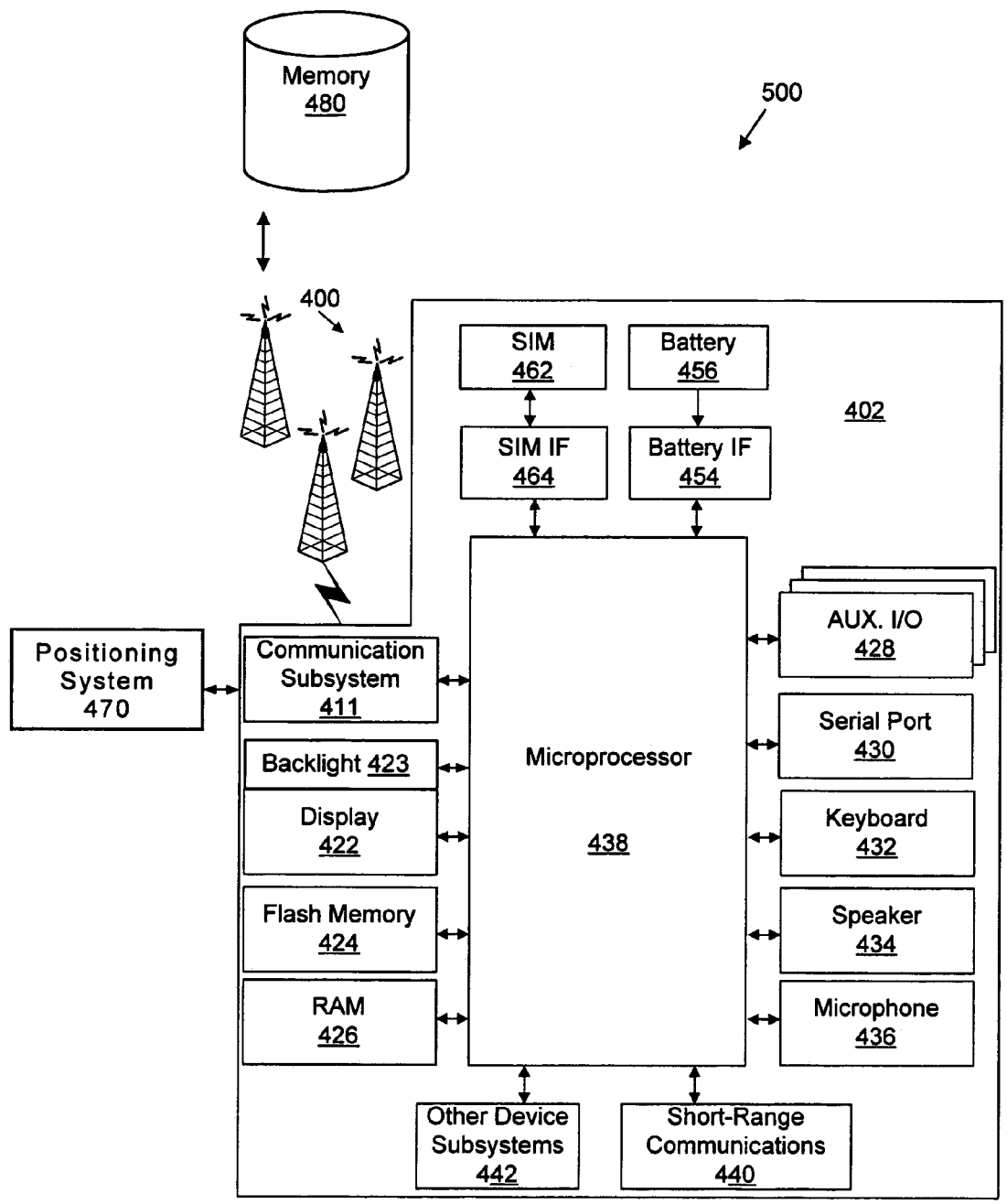
FIG. 4 shows a mobile electronic device having a position dependent backlight and an associated system.

Device and System. Referring to FIG. 4, a mobile electronic device 402 having a global position controlled backlight is shown in a system 500. The mobile electronic device 402 is preferably a two-way communication device having at least voice and advanced data communication capabilities, including the capability to communicate with other computer systems. Depending on the functionality provided by mobile electronic device 402, it may be referred to as a data messaging device, a two-way pager, a cellular telephone with data messaging capabilities, a wireless Internet appliance, or a data communication device (with or without telephony capabilities). Mobile electronic device 402 may communicate via a network 400, in this embodiment, any one of a plurality of fixed transceiver stations within its geographic coverage area.

Mobile electronic device 402 will normally incorporate a communication subsystem 411, which includes a receiver, a transmitter, and associated components, such as one or more (preferably embedded or internal) antenna elements and, local oscillators (LOs), and a processing module such as a digital signal processor (DSP) (all not shown). Communication subsystem 411. As will be apparent to those skilled in field of communications, particular design of communication subsystem 411 depends on the communication network in which mobile electronic device 402 is intended to operate. In this embodiment of the invention communication subsystem 411 includes a receiver configured to receive data from a positioning system 470 to accurately determine the global position of mobile electronic device 402.

Network access is associated with a subscriber or user of mobile electronic device 402 and therefore mobile electronic device 402 requires a Subscriber Identity Module or "SIM" card 462 to be inserted in a SIM IF 464 in order to operate in the network. Mobile electronic device 202 is a battery-powered device so it also includes a battery IF 454 for receiving one or more rechargeable batteries 456. Such a battery 456 provides electrical power to most if not all electrical circuitry in mobile electronic device 402, and battery IF 454 provides for a mechanical and electrical connection for it. The battery IF 454 is coupled to a regulator (not shown) which provides power V+ to all of the circuitry.

Mobile electronic device 402 includes a controller such as a microprocessor 438 which controls overall operation of mobile electronic device 402. Communication functions, including at least data and voice communications, are performed through communication subsystem 411. Microprocessor 438 also interacts with additional device subsystems such as a display 422, a backlight 423 for illuminating display 422, a flash memory 424, a random access memory (RAM) 426, auxiliary input/output (I/O) subsystems 428, a serial port 430, a keyboard 432, a speaker 434, a microphone 436, a short-range communications subsystem 440, and any other device subsystems generally designated at 442. Microprocessor is also capable of adjusting the intensity of backlight 420 according to a state of at least one light condition affecting ambient light at the global position of the device. Some of the subsystems shown in FIG. 4 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list. Operating system software used by microprocessor 438 is preferably stored in a persistent store such as flash memory 424, which may alternatively be a read-only memory (ROM) or similar storage element (not shown). Those skilled in the art will appreciate that the operating system, specific device applications, or parts thereof, may be temporarily loaded into a volatile store such as RAM 426.

Microprocessor 438, in addition to its operating system functions, preferably enables execution of software applications on mobile electronic device 402. A predetermined set of applications which control basic device operations, including at least data and voice communication applications, will normally be installed on mobile electronic device 402 during its manufacture. A preferred application that may be loaded onto mobile electronic device 402 may be a personal information manager (PIM) application having the ability to organize and manage data items relating to the user such as, but not limited to, instant messaging (IM), e-mail, calendar events, voice mails, appointments, and task items. Naturally, one or more memory stores are available on mobile electronic device 402 and SIM 462 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile electronic device user's corresponding data items stored and/or associated with a host computer system thereby creating a mirrored host computer on mobile electronic device 402 with respect to such items. This is especially advantageous where the host computer system is the mobile electronic device user's office computer system. Additional applications may also be loaded onto mobile electronic device 402 through network 400, an auxiliary I/O subsystem 428, serial port 430, short-range communications subsystem 440, or any other suitable subsystem 442, and installed by a user in RAM 426 or preferably a non-volatile store (not shown) for execution by microprocessor 438. Such flexibility in application installation increases the functionality of mobile electronic device 402 and may provide enhanced on-device functions, communication-related functions, or both. For example, secure communication applications may enable electronic commerce functions and other such financial transactions to be performed using mobile electronic device 402.

In a data communication mode, a received signal such as a text message, an e-mail message, or web page download will be processed by communication subsystem 411 and input to microprocessor 438. Microprocessor 438 will preferably further process the signal for output to display 422, to auxiliary I/O device 428 or both. A user of mobile electronic device 402 may also compose data items, such as e-mail messages, for example, using keyboard 432 in conjunction with display 422 and possibly auxiliary I/O device 428. Keyboard 432 is preferably a telephone type keypad, full alphanumeric keyboard or full or condensed QWERTY keypad. These composed items may be transmitted over a communication network through communication subsystem 411.

For voice communications, the overall operation of mobile electronic device 402 is substantially similar, except that the received signals would be output to speaker 434 and signals for transmission would be generated by microphone 436. Alternative voice or audio I/O subsystems, such as a voice message recording subsystem, may also be implemented on mobile electronic device 402. Although voice or audio signal output is preferably accomplished primarily through speaker 434, display 422 may also be used to provide an indication of the identity of a calling party, duration of a voice call, or other voice call related information, as some examples.

Serial port 430 in FIG. 4 is normally implemented in a personal digital assistant (PDA)-type communication device for which synchronization with a user's desktop computer is a desirable, albeit optional, component. Serial port 430 enables a user to set preferences through an external device or software application and extends the capabilities of mobile electronic device 402 by providing for information or software downloads to mobile electronic device 402 other than through a wireless communication network. The alternate download path may, for example, be used to load an encryption key onto mobile electronic device 402 through a direct and thus reliable and trusted connection to thereby provide secure device communication.

Short-range communications subsystem 440 of FIG. 4 is an additional optional component which provides for communication between mobile electronic device 402 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

In accordance with an embodiment of the invention, mobile electronic device 402 is configured for sending and receiving data items and includes a PIM for organizing and managing data items relating to the user such as, but not limited to, instant messaging (IM), e-mail, calendar events, calendar appointments, and task items, etc. By way of example, mobile electronic device 402 is configured for voice (which may include push to talk over cellular (POC)) and data services, voice mail service, e-mail service, SMS and chat services to which the user subscribes. To provide a user-friendly environment to control the operation of mobile electronic device 402, PIM together with the operation system and various software applications resident on the station 402 provides a GUI having a main screen from which to access various services via applications stored on said device or available to it.

In operation, communication subsystem 411 housing a positioning system receiver receives data transmitted from positioning system 470. Along with cartographic and locational data contained on flash memory 424, this positional data is processed by microprocessor 438 to determine a global position of mobile electronic device 402. Alternatively, including the global positions systems previously described, a general global position may be determined with reference to a local base station or other network 400 component with which device 402 is then communicating.

The state of various light conditions is then determined by microprocessor 438 based on the global position. Data regarding light conditions, such as whether conditions and position of the sun, can be downloaded to mobile electronic device 402 ahead of time and retrieved from flash memory 424 or preferably, retrieved real-time from an outside memory 480, such as a server, via network 400. It will also be understood by a person skilled in the art that the cartographic and locational data used to calculate global position, as may be necessary, may similarly be stored on and retrieved from outside memory 480 as an alternative to flash memory 424.

Microprocessor 438 then adjusts the intensity of backlight 423 according to the state of various light conditions. Adjustment may be as simple as turning the light on or off.

Although operations 100, 200 and 300, system 500 and device 402 have been described with respect to a backlight for a display on a mobile electronic device, it will be understood by a person skilled in the art that any light or illuminating device on a mobile electronic device may be controlled in this manner. For example, intensity of lights that illuminate a keypad or keyboard or of the display itself (eg. the brightness of an LCD display) may all be controlled in a geographical position dependent manner. Any lights associated with vehicles, such as, for example, headlights, dashboard lights, and electronic displays inside the vehicle may also be controlled in this manner.

Data Carrier Product. The sequences of instructions which when executed cause the methods described herein to be performed by system 500 can be contained in a data carrier product for transmission such as embodied in a carrier wave according to one embodiment of the invention.

Computer Software Product. The sequences of instructions which when executed cause the methods described herein to be performed by system 500 can be contained in a computer software product according to one embodiment of the invention. This computer software product can be loaded into and run by system 500.

Integrated Circuit Product. The sequences of instructions which when executed cause the methods described herein to be performed by system 500 can be contained in an integrated circuit product including a coprocessor or memory according to one embodiment of the invention. This integrated circuit product can be installed in system 500.

Although preferred embodiments of the invention have been described herein, it will be understood by those skilled in the art that variations may be made thereto without departing from the spirit of the invention or the scope of the appended claims.

The invention claimed is:

1. A method for controlling backlighting of a display on a mobile electronic device, the method comprising steps of:
   determining a current global position of the device;
   enabling an outdoor mode of the device;
   predicting ambient light at the current global position of the device based on a time of day and a time of year;
   obtaining current weather conditions for the current global position by wirelessly accessing weather condition data stored in memory residing on a server connected to the mobile device via a wireless network;
   calculating an ambient light value for the current global position of the device based on the predicted ambient light and the current weather conditions at the current global position of the device; and
   dynamically adjusting the backlighting of the display in response to changes in the ambient light value.

2. The method as claimed in claim 1, wherein determining the current global position of the device comprises using a global positioning system.

3. The method as claimed in claim 1, comprising the step of enabling a user to predefine a range of backlighting intensities corresponding to a predefined ambient light conditions.

4. The method as claimed in claim 1, wherein the step of enabling an outdoor mode of the device is performed in response to a user selection.

5. The method as claimed in claim 1, comprising the step of predicting whether the device is outdoors or indoors by comparing outdoor temperature conditions at the current global position of the device to an actual temperature measured by a temperature sensor on the device, the step of enabling an outdoor mode of the device being performed in response to the prediction of the device being outdoors.

6. The method as claimed in claim 1, comprising the step of predicting whether the device is outdoors or indoors by comparing outdoor temperature conditions at the current global position of the device to an actual temperature measured by a temperature sensor on the device.

7. The method as claimed in claim 1, wherein the step of obtaining the current weather conditions for the current global position comprises the step of downloading weather condition data through the wireless network.

8. A mobile electronic device having automatically controlled backlighting, the device comprising:
   a backlit display having adjustable backlighting;
   a means for determining a current global position of the device;
   a means for obtaining current weather conditions for the current global position of the device;
   a means for enabling an outdoor mode of the device; and
   a microprocessor for dynamically adjusting the backlighting of the backlit display in response to ambient light conditions that are predicted based on a time of day, a time of year, and the current weather conditions for the current global position of the device,
   wherein the means for obtaining current weather conditions for the current global position comprises a wireless data connection via a wireless network to a server that stores global weather data.

9. The device as claimed in claim 8 wherein the means for determining the current global position of the device is a global positioning system.

10. The device as claimed in claim 8 further comprising a temperature sensor for measuring an actual outdoor temperature to enable the device to compare the actual temperature measured by the temperature sensor to outdoor temperature conditions obtained wirelessly for the current global position of the device to thereby predict whether the device is indoors or outdoors, the enabling an outdoor mode of the device being performed in response to the prediction of the device being outdoors.

11. The device as claimed in claim 9 further comprising a temperature sensor for measuring an actual outdoor temperature to enable the device to compare the actual temperature measured by the temperature sensor to outdoor temperature conditions obtained wirelessly for the current global position of the device to thereby predict whether the device is indoors or outdoors.

12. The device as claimed in claim 8 further comprising a temperature sensor for measuring an actual outdoor temperature to enable the device to compare the actual temperature measured by the temperature sensor to outdoor temperature conditions obtained wirelessly for the current global position of the device to thereby predict whether the device is indoors or outdoors.

13. A system for automatically controlling backlighting on a mobile electronic device connected to a wireless network, the system comprising:
   a positioning system for determining a current global position of the device;
   a server for storing data relating to current ambient light conditions and weather data at various global positions, the ambient light conditions being determined by a time of day, a time of year, and current weather conditions prevailing at the respective global positions; and
   a wireless link connecting the mobile electronic device to the server for enabling the mobile device to retrieve an ambient light condition and current weather conditions for the current global position to thus enable the mobile device to dynamically adjust the backlighting of the display to provide suitable backlighting depending on the current ambient light conditions, the mobile electronic device operating in an outdoor mode.

14. The system as claimed in claim 13 wherein the positioning system is a global positioning system.

15. The system as claimed in claim 13 wherein the device comprises a temperature sensor for measuring an actual outdoor temperature to enable the device to compare the actual temperature measured by the temperature sensor to outdoor temperature conditions obtained wirelessly for the current global position of the device to thereby predict whether the device is indoors or outdoors, the outdoor mode of the device being enabled in response to the prediction of the device being outdoors.

16. The system as claimed in claim 14 wherein the device comprises a temperature sensor for measuring an actual outdoor temperature to enable the device to compare the actual temperature measured by the temperature sensor to outdoor temperature conditions obtained wirelessly for the current global position of the device to thereby predict whether the device is indoors or outdoors.

17. The device as claimed in claim 8, wherein the means for enabling the outdoor mode of the device is performed in response to a user selection.

18. The system as claimed in claim 13, wherein the outdoor mode is enabled in response to a user selection.

* * * * *